United States Patent [19]
Kasai

[11] 3,874,797
[45] Apr. 1, 1975

[54] ELLIPSOMETER

[75] Inventor: Toshiyuki Kasai, Kawasaki, Japan

[73] Assignee: Nippon Kogaku K.K., Tokyo, Japan

[22] Filed: Apr. 5, 1974

[21] Appl. No.: 458,426

[30] Foreign Application Priority Data
Apr. 13, 1973 Japan............................ 47-41357

[52] U.S. Cl................................ 356/118, 356/161
[51] Int. Cl................................................ G01n 21/40
[58] Field of Search............ 356/114, 115, 116, 118, 356/161; 350/147, 152; 250/285

[56] References Cited
UNITED STATES PATENTS
3,060,793  10/1962  Wells..................... 356/118
FOREIGN PATENTS OR APPLICATIONS
1,116,824  5/1956  France..................... 356/118

Primary Examiner—Ronald L. Wibert
Assistant Examiner—Paul K. Goodwin
Attorney, Agent, or Firm—Fitzpatrick, Cella, Harper & Scinto

[57] ABSTRACT

An ellipsometer includes a polarizing optical system, a first and a second optical path changing total reflecting prism, and an analyzer. Light from a light source passes through the polarizing optical system to leave it in the form of elliptical polarized light, which in turn passes through the first total reflection prism in which the elliptical polarized light is given a phase skip difference and deflected so as to impinge on the surface of a sample obliquely with respect thereto. The light so reflected by the first total reflection prism further passes through the second total reflection prism in which the light is given a phase skip difference and deflected in a direction substantially parallel to the optical axis of the polarizing optical system. The light passed through the second total reflection prism is finally extinguished by the analyzer.

4 Claims, 2 Drawing Figures

3,874,797

3,874,797

ELLIPSOMETER

BACKGROND OF THE INVENTION

1. Field of the Invention

This invention relates to an ellipsometer for effecting polarization analysis, and more particularly, to a small ellipsometer provided with total reflection prisms.

2. Description of the Prior Art

Among the techniques of causing a light to impinge on the surface layer of a material to facilitate investigation and study of the kind of material by analysis of the light reflected by the surface layer, one technique which utilizes polarization is referred to as polarization analysis, and it employs an ellipsometer, or the like.

In the conventional ellipsometer however, the optical-mechanical systems forming the light incidence and emergence sides thereof have each occupied a very large space as compared with the area of a sample to be measured, thus making the entire device very bulky and accordingly inconvenient for transportation or like purposes. Also, when the ellipsometer was to be used in a metering room of a laboratory or factory, for example, greater inconveniences have been encountered in the installation of the device because of the large space required by the same.

SUMMARY OF THE INVENTION

By means of the present invention, I am able to reduce the size of the ellipsometer and thus to avoid the foregoing difficulties and disadvantages, and I achieve this result by the use of total relfection prisms.

According to the present invention, there is provided a small ellipsometer for measuring the thickness, optical constant, or the like, of a sample from the polarization with which light impinging on the surface of the sample is reflected thereform. The ellipsometer may comprise a polarizing optical system disposed on an optical axis substantially perpendicular to the surface of the sample to be measured and for providing an emergence of elliptical polarized light, a first optical path changing total reflection prism for imparting a phase skip differnce to the elliptical polarized light emergent from the polarizing optical system and for totally reflecting the polarized light to deflect the path thereof so as to cause it to impinge obliquely on the sample surface, a second optical path changing total reflection prism for imparting a phase skip difference to the light reflected by the sample surface and for totally reflecting the reflected light to deflect the path thereof so as to be substantially parallel to the optical axis of the polarizing optical system, and an analyser for extinguishing the light passed through the second total reflection prism.

The polarizing optical system may comprise a light source, a monochrome filter for passing therethrough the light from said source, a polarizer for converting the monochromatic light from the monochrome filter into rectilinear polarized light, and a ¼ wavelength plate for converting the rectilinear polarized light from the polarizer into elliptical polarized light of an azimuth angle 45° with respect to the incidence surface of the sample.

The sum of the phase skip differences imparted by the first and second optical path changing total reflection prisms is 180°. More particularly, the phase skip difference by the first total reflection prism is 135° and the phase skip difference imparted by the second total reflection prism is 45°.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein.

DESCRIPTION OF THE PREFERRED EMBODIMENTS

Figure 1:
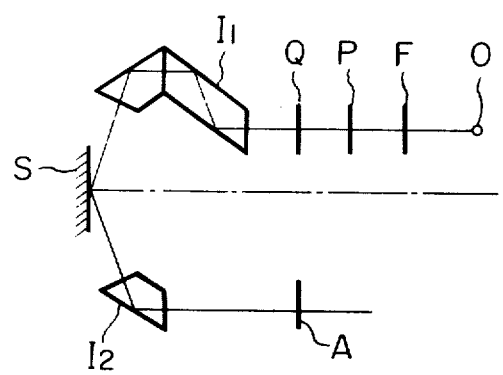
FIG. 1 is a schematic representation showing an arrangement according to one embodiment of the present invention.

Referring to FIG. 1, there is shown schematically an embodiment of the present invention including a light source O, a monochrome filter F and a rotatable polarizer P. Light from the source O, is converted by the filter and the polarizer into rectilinear polarized monochromatic light. A ¼ wavelength plate Q, set to an azimuth angle of −45° with respect to the surface of incidence, is provided to convert the rectilinear polarized light into elliptical polarized light. A total reflection type deformed Fresnel prism 11 is provided for causing the light passed perpendicularly to the surface of a sample S to be measured (hereinafter referred to as the sample surface) to impinge obliquely on the sample surface, and is designed so that a single internal reflection provides a phase skip difference of 45° between the component in the surface of incidence and the component in the surface perpendicular to the surface of incidence.

Another total reflection type deformed Fresnel prism 12 is provided for causing the light reflected by the sample surface to be deflected into a path perpendicular to the sample surface, and is designed to provide a phase skip difference of 45°. Designated by letter A is an analyzer for extinguishing the rectilinear polarized light from the prism 12 and this analyzer is rotatable about its own axis.

Figure 2:
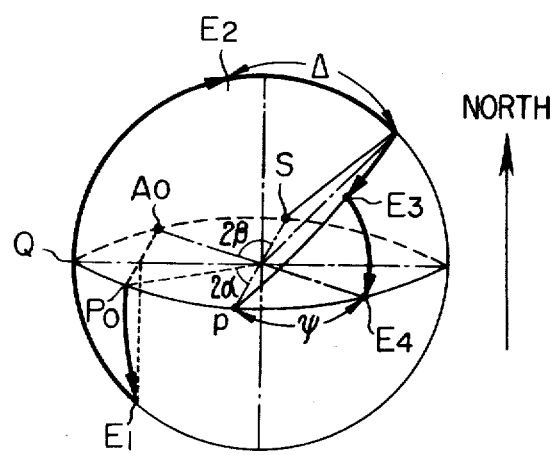
FIG. 2 is a view illustrating the principle of the measurement with the aid of a Poincaré sphere.

The principle and operation of the measurement by the inventive ellipsometer will now be described with the aid of the Poincaré sphere shown in FIG. 2, where P represents the surface of incidence (azimuth angle 0°) and S represents the surface perpendicular to the surface of incidence (azimuth angle 90°).

The rectilinear polarized light from the polarizer P of rotation angle α corresponding to P0 of the Poincaré sphere travels through the ¼ wavelength plate Q to be thereby converted into elliptical polarized light of an azimuth angle 45° corresponding to E1 of the Poincaré sphere, and further passes through the prism 11 to undergo a phase variation of 135° as shown by E2 of the Poincaré sphere. Such light then impinges on the sample surface. Here, the light undergoes a phase skip $\Delta$ and an amplitude ratio $\psi$, so that a light corresponding to E3 in FIG. 2 leaves the sample surface to enter the prism 12. Here, the light further undergoes a phase variation of 45° to provide rectilinear polarized light corresponding to E4 in FIG. 2. (In the Poincaré sphere, the rectilinear polarized light is shown on the equator, the lefthanded elliptical polarization is shown in the north hemisphere and the righthanded elliptical polarization is shown in the south hemisphere.) The light further passes through the prism 12 and is extinguished by the analyzer of rotation angle $\beta$.

The phase skip $\Delta$ and the amplitude ratio $\psi$ may be obtained directly from the Poincaré sphere:

$$\begin{cases} \Delta = 90 - 2\alpha \\ \psi = |2\beta| \end{cases}$$

These may be analyzed in the conventional manner.

In the present embodiment, the combined phase skip differences imparted by the two prisms 11 and 12 has been shown as 180°, whereas, a phase skip difference other than this may result in the same effect as described above. In such cases, it would be necessary to direct the rectilinear polarized light to the analyzer A as by a compensator disposed behind the prism 12 and, in addition, the subsequent calculations would unavoidably be more cumbersome.

According to the present invention, as described hitherto, I am able to achieve a reduction in the space occupied by the entire device as compared with the prior art, and this means a greater facility for transportation as well as a greater ease with which the device is installed in a place desired. Further, the prisms being of the total reflection type permit complete elimination of energy loss and also permit the device to be available for other wavelengths by interchanging the filter F and the wavelength plate Q accordingly.

I believe that the construction and operation of my novel ellipsometer will now be understood and that the advantages thereof will be fully appreciated by those persons skilled in the art.

I claim:

1. An ellipsometer for measuring the thickness, optical constant or the like of a sample from the polarization with which light impinging on the surface of the sample is reflected therefrom, said ellipsometer comprising:
   a polarizing optical system disposed on an optical axis substantially perpendicular to the surface of the sample to be measured and for providing an emergence of elliptical polarized light;
   a first optical path changing total reflection prism for imparting a phase skip difference to the elliptical polarized light emergent from said polarizing optical system and for totally reflecting said polarized light to deflect the path thereof to cause it to impinge obliquely on said sample surface;
   a second optical path changing total reflection prism for imparting a phase skip difference to said light reflected by said surface of the sample and for totally reflecting said reflected light to deflect the path thereof to cause it to be substantially parallel to the optical axis of said polarizing optical system; and
   an analyzer for extinguishing the light passed through said second total reflection prism.

2. An ellipsometer according to claim 1, wherein said polarizing optical system comprises:
   a light source;
   a monochrome filter for passing therethrough the light from said source;
   a polarizer for converting the monochromatic light from said monochrome filter into rectilinear polarized light; and
   a ¼ wavelength plate for converting said rectilinear polarized light from said polarizer into elliptical polarized light of an azimuth angle 45° with respect to the incidence surface of the sample.

3. An ellipsometer according to claim 1, wherein the sum of the phase skip differences imparted by said first and second optical path changing total reflection prisms is 180°.

4. An ellipsometer according to claim 3, wherein the phase skip difference imparted by said first optical path changing total reflection prism is 135° and the phase skip difference imparted by said second optical path changing total reflection prism is 45°.

* * * * *